United States Patent [19]

Sato

[11] Patent Number: 4,515,412
[45] Date of Patent: May 7, 1985

[54] DUAL TYPE ANTILOCK BRAKING DEVICE FOR FOUR-WHEELED VEHICLES

[75] Inventor: Makoto Sato, Kamifukuoka, Japan

[73] Assignee: Honda Giken Kogyo Kabushiki Kaisha, Tokyo, Japan

[21] Appl. No.: 515,818

[22] Filed: Jul. 21, 1983

[30] Foreign Application Priority Data

Jul. 22, 1982 [JP] Japan .................. 57-111123[U]

[51] Int. Cl.³ ............................................. B60T 8/02
[52] U.S. Cl. ................................... 303/6 R; 303/92; 303/116; 303/119; 303/111
[58] Field of Search .............. 303/6 R, 92, 6 A, 6 C, 303/113–119, 10, 13, 15, 111, 61–63, 68–69; 188/345, 349, 106 R, 181, 151 A

[56] References Cited

U.S. PATENT DOCUMENTS

| | | | |
|---|---|---|---|
| 3,738,712 | 6/1973 | Flory | 303/114 |
| 3,866,983 | 2/1975 | Kondo | 303/119 |
| 4,345,796 | 8/1982 | Reinecke | 303/111 X |
| 4,418,966 | 12/1983 | Hattwig | 303/119 X |
| 4,460,220 | 7/1984 | Petersen | 303/111 X |

*Primary Examiner*—Douglas C. Butler
*Attorney, Agent, or Firm*—Armstrong, Nikaido, Marmelstein & Kubovcik

[57] ABSTRACT

A dual type antilock braking device for four-wheeled vehicles wherein braking wheel cylinders for front and rear wheels are connected with each other in the form of X to provide first and second braking hydraulic systems. The device includes a pair of cylinders each of which has a central antilock controlling hydraulic chamber defined between first pistons mounted at the inner ends of rods capable of slidably penetrating axially spaced partition walls, primary braking hydraulic chambers defined between the first pistons and the partition walls, and secondary braking hydraulic chambers defined between the partition walls and second pistons mounted at the outer ends of the rods. Each of the rods is formed with communicating grooves through which the primary braking hydraulic chamber is able to be communicated with the secondary braking hydraulic chamber when the rods moves inward by a distance exceeding a given amount. The primary braking hydraulic chambers of each cylinder are separately connected to a hydraulic source through the first and second braking hydraulic systems. The secondary braking hydraulic chambers are connected to wheel cylinders for the front and rear wheels in both braking hydraulic chambers, respectively. With this arrangement, if either one of the wheel cylinders for front and rear wheels in one braking hydraulic system be failed, the other wheel cylinder in the same system is also made inoperative, so that normal braking action can be effected using the remaining braking hydraulic system which continues to operate normally.

1 Claim, 2 Drawing Figures

FIG. I

DUAL TYPE ANTILOCK BRAKING DEVICE FOR FOUR-WHEELED VEHICLES

FIELD OF THE INVENTION

This invention relates to an antilock braking device for vehicles which is adapted to prevent wheel lock when the vehicles are braked, for the purpose of improving the braking efficiency, and more particularly to a dual type antilock braking device for four-wheeled vehicles wherein braking wheel cylinders for front and rear wheels are connected with each other in the form of X and a braking hydraulic system is composed of dual systems divided independently of each other.

BACKGROUND OF THE INVENTION

The applicant of this application has previously proposed a dual type antilock braking device of this kind in Japanese Patent Application No. 56-98976 filed on June 25, 1981. However, such a device has encountered a disadvantage as follows. In the event either one of the wheel cylinders for front and rear wheels be failed, there cannot be obtained a good balance in braking forces applied to both wheels because the other wheel cylinder in the same system continues to operate normally.

SUMMARY OF THE INVENTION

Therefore, it is an object of this invention to provide a dual type antilock braking device for four-wheeled vehicles of simple construction, in which if either one of wheel cylinders for front and rear wheels in one braking hydraulic system be failed, the other wheel cylinder in the same system is also made inoperative, so that normal braking action can be effected using only the remaining braking hydraulic system which continues to operate normally, thereby solving the above-mentioned disadvantage encountered in the previous patent application.

The above and other objects and features of this invention will be apparent from the following description made with reference to the accompanying drawings.

DESCRIPTION OF THE PREFERRED EMBODIMENT

Figure 1:
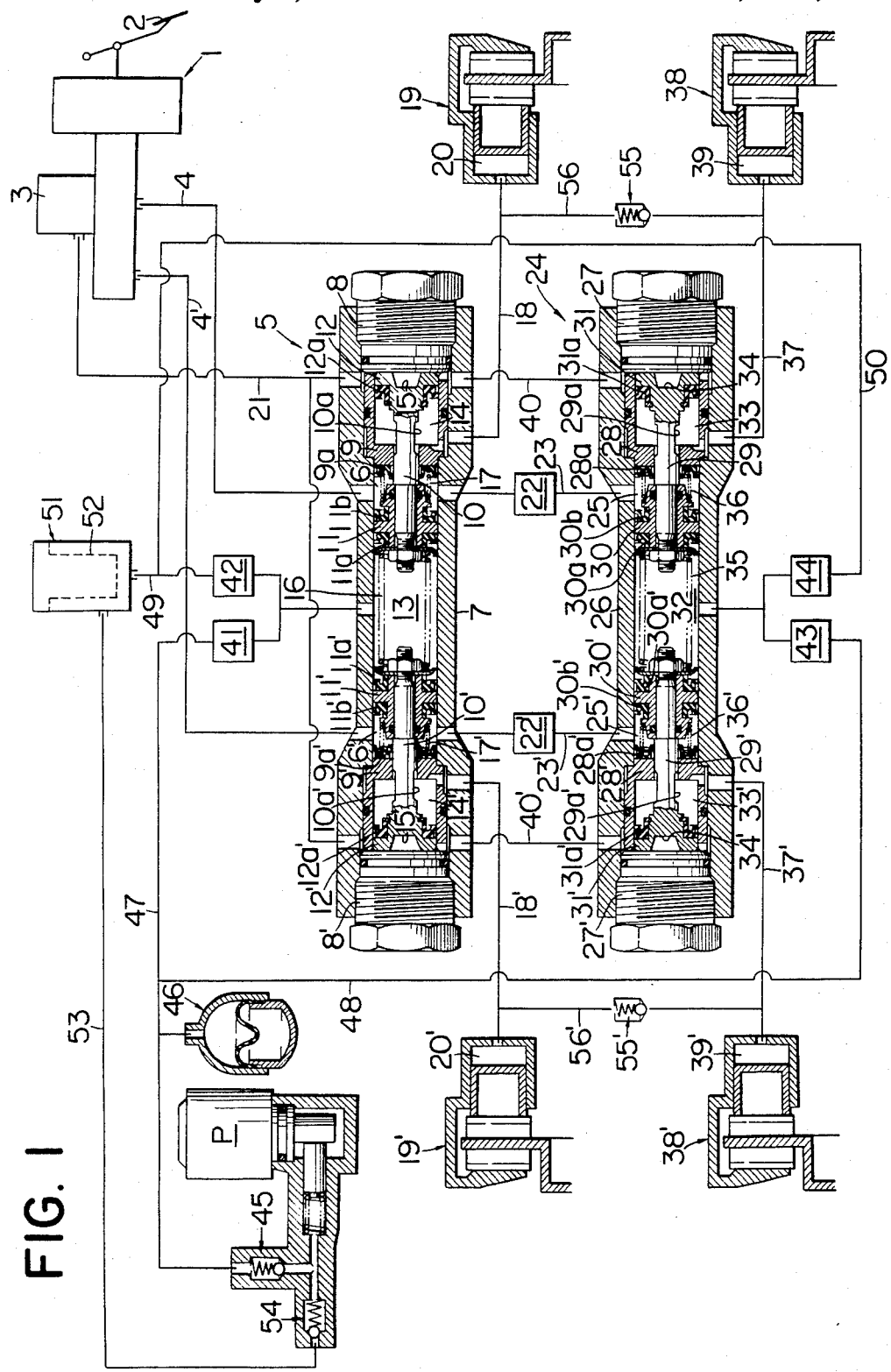
FIG. 1 is a hydraulic circuit diagram for a device according to this invention.

In the following there will be described an embodiment of this invention when applied to an antilock braking device for four-wheeled automotive vehicles of front engine, front wheel driving type wherein the supporting load on the front wheel side is larger than that on the rear wheel side. Referring first to FIG. 1, when a brake pedal 2 is trod on, a tandem type master cylinder 1 serves to feed braking oil supplied from an oil tank 3 to primary braking hydraulic chambers 6, 6' of a front wheel side braking hydraulic adjuster 5 through a pair of oil passages 4, 4' which constitute braking hydraulic systems independent of each other, respectively.

The front wheel side braking hydraulic adjuster 5 comprises a cylinder 7 having both ends closed by a pair of end wall members 8, 8'; a pair of partition walls 9, 9' disposed within the cylinder 7 in positions spaced from the respective end wall members 8, 8'; and a pair of rods 10, 10' which include pairs of pistons 11, 12 and 11', 12' respectively at both ends thereof and which have those portions between both pistons that slidably penetrate through the corresponding partition walls 9, 9' in the axial direction. A cylinder chamber between the partition wall 9 and the piston 11 constitutes a primary braking hydraulic chamber 6 in a first hydraulic system which chamber is communicated with the master cylinder 1 through the oil passage 4, a cylinder chamber between the partition wall 9 and the piston 12 constitutes a secondary braking hydraulic chamber 14 in the first hydraulic system which chamber is communicated with a wheel cylinder hydraulic chamber 20 of a wheel cylinder 19 for right front wheel through an oil passage 18, and a cylinder chamber between the end wall member 8 and the piston 12 constitutes a releasing oil chamber 15 communicated with the oil tank 3 through an oil passage 21. On the other hand, a cylinder chamber between the partition wall 9' and the piston 11' constitutes a primary braking hydraulic chamber 6' in a second hydraulic system which chamber is communicated with the master cylinder 1 through the oil passage 4', a cylinder chamber between the partition wall 9' and the piston 12' constitutes a secondary braking hydraulic chamber 14' in the second hydraulic system which chamber is communicated with a wheel cylinder hydraulic chamber 20' of a wheel cylinder 19' for left front wheel through an oil passage 18', and a cylinder chamber between the end wall member 8' and the piston 12' constitutes a releasing oil chamber 15' communicated with the oil tank 3 through the oil passage 21. Further, a cylinder chamber between the pair of pistons 11 and 11' constitutes an antilock controlling hydraulic chamber 13 to or from which antilock controlling oil is supplied or exhausted depending on the associated operation of an intake pressure control valve 41 and an exhaust pressure control valve 42.

A compressed spring 16 is interposed between the pair of pistons 11 and 11', while compressed springs 17, 17' are interposed respectively between the partition wall 9 and the piston 11 and between the partition wall 9' and the piston 11'. The resilient restoring action of these compressed springs 16 and 17, 17' allows the respective pistons 11, 12 and 11', 12' to be moved smoothly in a resilient fashion and to be held in proper positions at all times while the brakes are not applied.

In order to prevent a leak of pressurized oil between the adjacent cylinder chambers, the so-called cup type seal members 11a, 11b and 11a', 11b' in the annular form, which have an effect of preventing a reverse flow of the pressurized oil, are respectively mounted on both sides of the pistons 11, 11', cup type seal members 9a, 9a' are respectively mounted to the partition walls 9, 9' on the side of the primary braking hydraulic chambers 6, 6', and cup type seal members 12a, 12a' are respectively mounted to the pistons 12, 12' on the side of the secondary braking hydraulic chambers 14, 14'. Among them, the pair of seal members 9a, 9a' serve to prevent a leak of the pressurized oil within the primary braking hydraulic chambers 6, 6' into the secondary braking hydraulic chambers 14, 14' thereby to avoid that the pistons 12, 12' lose a function to move in the direction approaching to each other, while the pair of seal members 12a, 12a' serve to prevent a leak of the pressurized oil within the secondary braking hydraulic chambers 14, 14' into the side of the oil passage 21 thereby to ensure that the sufficient secondary braking oil pressure will be generated.

The piston rods 10, 10' are formed on the outer peripheries of their intermediate portions with several communicating grooves 10a, 10a' extending in the axial direction, respectively, so that when the piston rods 10, 10' are moved inward exceeding a predetermined distance, the primary braking hydraulic chambers 6, 6' and the secondary braking hydraulic chambers 14, 14' defined on both sides of the partition walls 9, 9' are communicated with each other through the communicating grooves 10, 10a', respectively.

Furthermore, the primary braking hydraulic chambers 6, 6' are respectively communicated with corresponding primary hydraulic chambers 25, 25' of a rear wheel side braking hydraulic adjustor 24 through oil passages 23, 23' which include hydraulic control valves 22, 22' in the intermediate portions thereof. The rear wheel side braking hydraulic adjustor 24 has basically the same construction as the front wheel side braking hydraulic adjuster 5. More specifically, the adjuster 24 comprises a cylinder 26 having both ends closed by a pair of end wall members 27, 27'; a pair of partition walls 28, 28' disposed within the cylinder 26 in positions spaced from the respective end wall members 27, 27'; and a pair of rods 29, 29' which include pairs of pistons 30, 31 and 30', 31' respectively at both ends thereof and which have those portions between both pistons that slidably penetrate through the corresponding partition walls 28, 28' in the axial direction. A cylinder chamber between the partition wall 28 and the piston 30 constitutes a primary braking hydraulic chamber 25 in the first hydraulic system which chamber is communicated with the master cylinder 1 through the hydraulic control valve 22, the primary braking hydraulic chamber 6 of the front wheel side braking hydraulic adjuster 5 and the oil passage 4, a cylinder chamber between the partition wall 28 and the piston 31 constitutes a secondary braking hydraulic chamber 33 in the first hydraulic system which chamber is communicated with a wheel cylinder hydraulic chamber 39 of a wheel cylinder 38 for left rear wheel through an oil passage 37, and a cylinder chamber between the end wall member 27 and the piston 31 constitutes a releasing oil chamber 34 communicated with the oil tank 3 through an oil passage 40, the releasing oil chamber 15 of the front wheel side braking hydraulic adjustor 5 and the oil passage 21. On the other hand, a cylinder chamber between the partition wall 28' and the piston 30' constitutes a primary braking hydraulic chamber 25' in the second hydraulic system which chamber is communicated with the master cylinder 1 through the oil passage 23', the hydraulic control valve 22', the primary braking hydraulic chamber 6' of the front wheel side braking hydraulic adjuster 5 and the oil passage 4', a cylinder chamber between the partition wall 28' and the piston 31' constitutes a secondary braking hydraulic chamber 33' in the second hydraulic system which chamber is communicated with a wheel cylinder hydraulic chamber 39' of a wheel cylinder 38' for right rear wheel through an oil passage 37', and a cylinder chamber between the end wall member 27' and the piston 31' constitutes a releasing oil chamber 34' communicated with the oil tank 3 through an oil passage 40', the releasing oil chamber 15' of the front wheel side braking hydraulic adjuster 5 and the oil passage 21. Further, a cylinder chamber between the pair of pistons 30 and 30' constitutes an antilock controlling the hydraulic chamber 32 to or from which antilock controlling oil is supplied or exhausted depending on the associated operation of an intake pressure control valve 43 and an exhaust pressure control valve 44.

A compressed spring 35 is interposed between the pair of pistons 30 and 30', while compressed springs 36, 36' are interposed respectively between the partition wall 28 and the piston 30 and between the partition wall 28' and the piston 30'. The resilient restoring action of these compressed springs 35 and 36, 36' allows the respective pistons 30, 31 and 30', 31' to be moved smoothly in a resilient fashion and to be held in proper positions at all times while the brakes are not applied.

Likewise the construction of the front wheel side braking hydraulic adjuster 5, in order to prevent a leak of pressurized oil between the adjacent cylinder chambers, cup type seal members 30a, 30b and 30a', 30b' are respectively mounted on both sides of the pistons 30, 30', cup type seal members 28a, 28a' are respectively mounted to the partition walls 28, 28' on the side of the primary braking hydraulic chambers 25, 25', and cup type seal members 31a, 31a' are respectively mounted to the pistons 31, 31' on the side of the secondary braking hydraulic chambers 33, 33'.

The piston rods 29, 29' are formed on the outer peripheries of their intermediate portions with several communicating grooves 29a, 29a' extending in the axial direction, respectively, so that when the piston rods 10, 10' are moved inward exceeding a predetermined distance, the primary braking hydraulic chambers 25, 25' and the secondary braking hydraulic chambers 33, 33' defined on both sides of the partition walls 28, 28' are communicated with each other through the communicating grooves 29a, 29a', respectively.

The pair of hydraulic control valves 22, 22' serve to regulate the primary braking oil pressure, particularly immediately after the starting of braking operation, such that a braking force exerted on the rear wheels subject to smaller supporting load becomes smaller than that exerted on the front wheels subject to larger supporting load in accordance with distribution of the supporting load. In other words, particularly immediately after the starting of braking operation, the oil pressure lowering action of the paired hydraulic control valves 22, 22' hold the oil pressure within the pair of primary braking hydraulic chambers 25, 25' lower than that within the pair of primary braking hydraulic chambers 6, 6' in accordance with distribution of the supporting load for both front and rear wheels. As a result, after the starting of braking operation, the oil pressure generated within the secondary braking hydraulic chambers 14, 14' on the front wheel side becomes larger than that generated within the secondary braking hydraulic chambers 33, 33' on the rear wheel side. Thus, if there occurs such an accident that the secondary braking hydraulic system on the front wheel side is failed and no oil pressure is transmitted to the wheel cylinders 19, 19' on the front wheel side, the loss in a braking effect for the entire vehicle is increased comparing to the case where the secondary braking hydraulic system on the rear wheel side is failed, thereby resulting in a disadvantageous condition. Therefore, as a means for preventing the occurrence of such condition, the pair of oil passages 18, 18' are capable of being communicated with the corresponding oil passages 37, 37' through oil passages 56, 56', respectively, which include check valves 55, 55' in the intermediate portions thereof. With this, in the event the secondary braking hydraulic system on the front wheel side is so failed that there occurs no secondary braking oil pressure in at least one of the paired secondary braking hydraulic chambers 14, 14' and the oil pressure within the wheel cylinder hydraulic chambers 39, 39' on the rear wheel side becomes higher than that within the wheel cylinder hydraulic chambers 20, 20' on the front wheel side above the setting pressure, the oil pressure within the secondary braking hydraulic chambers 33, 33' on the rear wheel side is immediately transmitted to the corresponding wheel cylinder hydraulic chambers 20, 20' on the front wheel side.

The antilock controlling system will be described hereinafter. Controlling oil pressurized by a hydraulic source P such as a plunger pump is fed to the intake pressure control valve 41 through a check valve 45 and an oil passage 47 which is communicated at its intermediate portion with an accumulator 46, and also to the intake pressure control valve 43 through an oil passage 48 branched off from the oil passage 47. On the other hand, the controlling oil exhausted from the exhaust pressure control valve 42 is fed to an oil tank 51 through an oil passage 49, and the controlling oil exhausted from the exhaust pressure control valve 44 is fed to the oil tank 51 through both oil passages 50 and 49. Then, the controlling oil within the oil tank 51 enters into the hydraulic source P through an oil passage 53 and a check valve 54 after passing through a filter 52 so as to be pressurized once again.

Hereinafter there will be described an opening and closing control system for the intake pressure control valves 41, 43 and the exhaust pressure control valves 42, 44 in the antilock controlling system.

Figure 2:
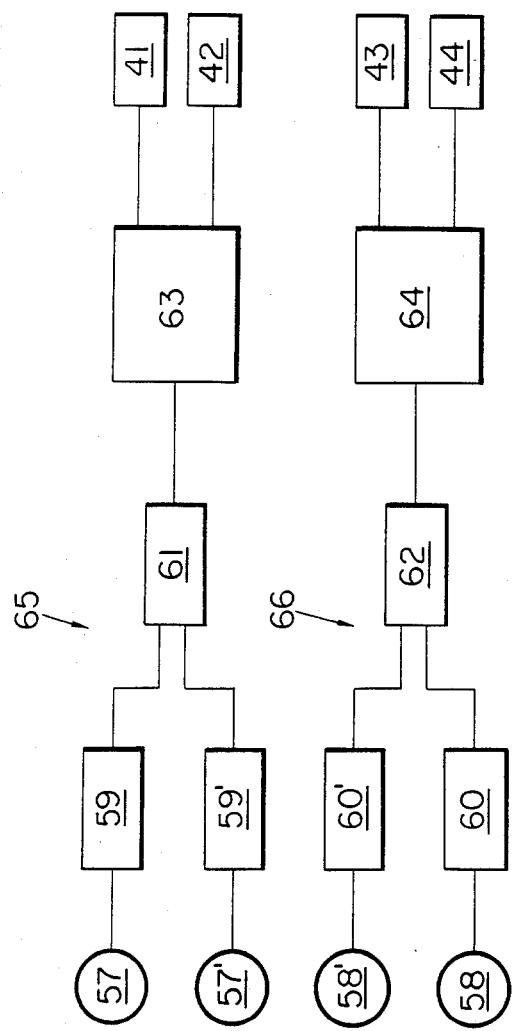
FIG. 2 is a block diagram for an antilock control system in the device.

Referring now to FIG. 2, both intake pressure control valve 41 and exhaust pressure control valve 42 are controlled to be opened and closed by a later stage-actuated type antilock controlling hydraulic feeder 65, while both intake pressure control valve 43 and exhaust pressure control valve 44 are controlled to be opened and closed by an earlier stage-actuated type antilock controlling hydraulic feeder 66. A wheel speed detector 57 for right front wheel generates a signal which is converted into a wheel speed signal proportional to the circumferential speed of the right front wheel by a wheel speed calculator 59 and then sent to a high-speed signal selector 61 such as a high selecting circuit, while a wheel speed detector 57' for left front wheel generates a signal which is converted into a wheel speed signal proportional to the circumferential speed of the left front wheel by a wheel speed calculator 59' and then sent to the high-speed signal selector 61. The high-speed signal selector 61 selects one of the wheel speed signals corresponding to either one of the left and right front wheels which has the higher circumferential speed, and transmits the selected signal to a front wheel control circuit 63. The front wheel control circuit 63 calculates the slip factor and shift in speed on either one of the left and right front wheels which has the higher circumferential speed, and it normally holds the intake pressure control valve 41 in the closed state and the exhaust pressure control valve 42 in the opened state. But, when either one of the left and right front wheels which has the higher circumferential speed, i.e., the wheel coming into the locked state later, is brought into the locked state, the control circuit 63 makes the intake pressure control valve 41 change to the opened state and the exhaust pressure control valve 42 change to the closed state immediately, so that the controlling oil fed from the hydraulic source P may be introduced into the antilock controlling hydraulic chamber 13.

On the other hand, a wheel speed detector 58' for right rear wheel generates a signal which is converted into a weel speed signal proportional to the circumferential speed of the right rear wheel by a wheel speed calculator 60' and then sent to a low-speed signal selector 62 such as a low selecting circuit, while a wheel speed detector 58 for left rear wheel generates a signal which is converted into a wheel speed signal proportional to the circumferential speed of the left rear wheel by a wheel speed calculator 60 and then sent to the low-speed signal selector 62. The low-speed signal selector 62 selects one of the wheel speed signals corresponding to either one of the left and right rear wheels which has the lower circumferential speed, and transmits the selected signal to a rear wheel control circuit 64. The rear wheel control circuit 64 calculates the slip factor and shift in speed on either one of the left and right rear wheels which has the lower circumferential speed, and it normally holds the intake pressure control valve 43 in the closed state and the exhaust pressure control valve 44 in the opened state. But, when either one of the left and right rear wheels which has the lower circumferential speed, i.e., the wheel coming into the locked state earlier, is brought into the locked state, the control circuit 64 makes the intake pressure control valve 43 change to opened state and the exhaust pressure control valve 44 change to the closed state immediately, so that the controlling oil fed from the hydraulic source P may be introduced into the antilock controlling hydraulic chamber 32.

The intake pressure control valves 41, 43 and the exhaust pressure control valves 42, 44 may be of electromagnetic control valves to be actuated by electromagnetic solenoids. In this case, the intake pressure control valves 41 and 43 can be constituted such that they are held in the closed state when not energized and in the opened state when energized, while the exhaust pressure control valves 42 and 44 can be constituted such that they are held in the opened state when not energized and in the closed state when energized.

With the arrangement as mentioned above, when the brake pedal 2 is trod on for braking operation, the braking pressure generated within the master cylinder 1 is transmitted into the primary braking hydraulic chambers 6, 6' on the front wheel side through the oil passages 4, 4', and also into the primary braking hydraulic chambers 25, 25' on the rear wheel side through the oil passages 23, 23'. As a result, each pair of pistons 11, 11' and 30, 30' are pushed by virtue of the primary braking oil pressure within the primary braking hydraulic chambers 6, 6' and 25, 25', respectively, so that the rods 10, 10' and 29, 29' are moved to approach each other in the corresponding cylinders 7, 26 in the axial direction, thereby causing the secondary braking oil pressure within the respective secondary braking hydraulic chambers 14, 14' and 33, 33'. At this time, the pair of hydraulic control valves 22, 22' makes an adjustment in such a manner that the primary braking oil pressure within the primary braking hydraulic chambers 25, 25' on the rear wheel side becomes lower than that within the primary braking hydraulic chambers 6, 6' on the front wheel side in accordance with distribution of the supporting load for the both wheels. Accordingly, the secondary braking oil pressure generated within the secondary braking hydraulic chambers 33, 33' on the rear wheel side assumes a lower level than that generated within the secondary braking hydraulic chambers 14, 14' on the front wheel side in accordance with distribution of the supporting load for both wheels.

The secondary braking oil pressure generated within the secondary braking hydraulic chambers 14, 14' on the front wheel side is immediately transmitted to the wheel cylinder hydraulic chamber 20 of the wheel cylinder 19 for right front wheel and the wheel cylinder hydraulic chamber 20' of the wheel cylinder 19' for left front wheel through the oil passages 18, 18', respectively, thereby applying the braking force to the left and right front wheels. Meanwhile, the secondary braking oil pressure generated within the secondary braking hydraulic chamber 33, 33' on the rear wheel side is immediately transmitted to the wheel cylinder hydraulic chamber 39 of the wheel cylinder 38 for left rear wheel and the wheel cylinder hydraulic chamber 39' of the wheel cylinder 38' for right rear wheel through the oil passages 37, 37', respectively, thereby applying the braking force to the left and right rear wheels.

If the secondary braking hydraulic system on the front wheel side be failed with some reason and, at the time of braking, the oil pressure within the wheel cylinder hydraulic chamber 39 or 39' on the rear wheel side becomes higher than that within the wheel cylinder hydraulic chamber 20 or 20' on the front wheel side above the setting pressure for the corresponding check valve 55 or 55', the oil pressure within the corresponding secondary braking hydraulic chamber 33 or 33' on the rear wheel side is immediately transmitted into the wheel cylinder hydraulic chamber 20 or 20' on the front wheel side through the oil passage 56 or 56', thereby to compensate the loss in braking force on the front wheel side.

While braking, when either one of the left and right front wheels coming into the locked state later is brought into the locked state, the intake pressure control valve 41 is changed from the closed state to opened state and the exhaust pressure control valve 42 is changed from the opened state to the closed state by operation of the later stage-actuated type antilock controlling hydraulic feeder 65, whereby the controlling oil fed from the hydraulic source P is directly introduced into the antilock controlling hydraulic chamber 13 thereby to push the pair of pistons 11 and 11' in the direction departing from each other. As a result, the secondary braking oil pressure within the secondary braking hydraulic chambers 14, 14' is lowered so that the braking force exerted on the left and right front wheels from the wheel cylinders 19, 19' is moderated or released until the left and right rear wheels become free from the locked state. During this process, the oil within the releasing oil chambers 15, 15' is pushed by the pistons 12, 12' to be returned into the oil tank 3 through the oil passage 21.

In the event at least one of the left and right rear wheels is locked, the earlier stage-actuated type antilock controlling hydraulic feeder 66 operates to open the pressure control valve 43 which has been closed while closing the exhaust pressure control valve 44. In consequence, the control oil delivered by the hydraulic pressure source P is introduced into the antilock controlling hydraulic chamber 32 to push the pair of pistons 30 and 30' in the direction departing from each other. As a result, the secondary braking oil pressure within the secondary braking hydraulic chambers 33, 33' is lowered so that the braking force exerted on the left and right rear wheels from the wheel cylinders 38, 38' is moderated or released until the left and right rear wheels become free from the locked state. During this process, the oil within the releasing oil chambers 34, 34' is pushed by the pistons 31, 31' to be returned into the oil tank 3 through the oil passages 40, 40', the releasing oil chambers 15, 15' and the oil passage 21, respectively.

In the event any one of the wheel cylinders 19, 19', 38 and 38', for example, the wheel cylinder 19 for right front wheel, is failed at the time of braking, the oil pressure within the secondary braking hydraulic chamber 14 communicated with the wheel cylinder hydraulic chamber 20 is lowered. Thus, the rod 10 is moved leftward (in FIG. 1) by virtue of the oil pressure within the primary braking hydraulic chamber 6 to communicate the primary braking hydraulic chamber 6 with the secondary braking hydraulic chamber 14 through the communicating grooves 10a, so that the pressurized oil is made to flow into the secondary braking hydraulic chamber 14 from the primary braking hydraulic chamber 6, thereby reducing the pressure within the primary braking hydraulic chamber 6. Accordingly, the pressure within the primary braking hydraulic chamber 25 communicated with the primary braking hydraulic chamber 6 and adapted to operate the wheel cylinder 38 for rear wheel in the first braking hydraulic system is also reduced, whereby the wheel cylinder 38 for rear wheel is made inoperative. As a result, since all of the wheel cylinders 19, 38 in the failed first braking hydraulic system fall into the inoperative state and only the wheel cylinders 19', 38' in the remaining second braking hydraulic system continue to operate normally, the braking forces applied to the wheels are well-balanced as a whole and hence the stability in steering will not be impaired. On the other hand, if the wheel cylinder 38 for rear wheel be failed, the primary braking hydraulic chamber 25 adapted to actuate the wheel cylinder 38 is communicated with the secondary braking hydraulic chamber 33 through the communicating grooves 29a to reduce the pressure within the primary braking hydraulic chamber 25. Consequently, since the pressure wihtin the primary braking hydraulic chamber 6 communicated with the primary braking hydraulic chamber 25 and adapted to actuate the wheel cylinder 19 for front wheel is reduced, the wheel cylinder 19 for front wheel is also made inoperative, so that the braking forces applied to the wheels are well-balanced as a whole in this case, too.

According to this invention, as fully described in the above, in an antilock braking device for vehicles wherein braking wheel cylinders for a four-wheeled vehicle are connected with each other in the form of X to provide first and second braking hydraulic systems independent of each other, since the cylinders 7 and 26 closed at both ends thereof and provided with the pair of partition walls 9, 9' and 28, 28' in the interior thereof as well as the pair of rods 10, 10' and 29, 29' having the pistons 11, 11'; 30, 30' and 12, 12'; 31, 31' at both ends thereof, respectively, and capable of slidably penetrating through the corresponding partition walls are arranged to form the primary braking hydraulic cahmbers 6 and 25 respectively between the partition wall 9 and the first piston 11 and between the partition wall 28 and the first piston 30, the secondary braking hydraulic chambers 14 and 33 respectively between the partition wall 9 and the second piston 12 and between the partition wall 28 and the second piston 31, as well as the antilock controlling hydraulic chambers 13 and 32 respectively between the pair of first pistons 11 and 11' between the pair of the first pistons 30 and 30', the primary braking oil pressure is fed from the hydraulic source to each of the braking hydraulic systems in double to generate the secondary braking oil pressures which are transmitted to the corresponding wheel cylinders thereby to actuate them, and when regulating the secondary braking oil pressures, both pressures in the respective braking hydraulic systems are regulated at the same time only by introducing the controlling oil pressure into the antilock controlling hydraulic chambers 13 and 32. As a whole, there can be attained a dual type antilock braking device for four-wheeled vehicles which has a simple construction, can operate positively, is simple in the arrangement of the oil passages and which has a high practical value.

Furthermore, since the rods 10, 10' and 29, 29' are respectively formed with the communicating grooves 10a, 10a' and 29a, 29a' through which the adjacent primary and secondary braking hydraulic chambers 17, 14; 17', 14' and 36, 33; 36', 33' are able to be communicated with each other, if either one of the wheel cylinders in one braking hydraulic system, for example, the wheel cylinder 19 for right front wheel in the first braking hydraulic system, be failed, the associated rod 10 is pushed by virtue of the oil pressure within the primary braking hydraulic chamber 6 on the front wheel side to move toward the adjacent antilock controlling hydraulic chamber 13, whereby the primary braking hydraulic chamber 6 is communicated with the secondary braking hydraulic chamber 14 through the communicating grooves 10a formed on the rod 10 to reduce the pressure within the primary braking hydraulic chamber 6. Accordingly, the pressure within the primary braking hydraulic chamber 25 on the rear wheel side which is communicated with the primary braking hydraulic chamber 6 on the front wheel side and located in the first braking hydraulic system, is also reduced so that the wheel cylinder 38 for rear wheel in the first braking hydraulic system is also made inoperative. On the other hand, if the wheel cylinder 38 for right rear wheel in the first braking hydraulic system be failed, the rod 29 is pushed by virtue of the oil pressure within the primary braking hydraulic chamber 25 on the rear side to move toward the adjacent antilock controlling hydraulic chamber 32, whereby the primary braking hydraulic chamber 25 is communicated with the secondary braking hydraulic chamber 33 through the communicating grooves 29a formed on the rod 29 to reduce the pressure within the primary braking hydraulic chamber 25. Accordingly, the pressure within the primary braking hydraulic chamber 6 on the front wheel side which is communicated with the primary braking hydraulic chamber 25 on the rear wheel side, is also reduced so that the wheel cylinder 19 for right front wheel is also made inoperative. In either case, since both wheel cylinders 19 and 38 for front and rear wheels in the failed braking hydraulic system fall into the inoperative state, the braking forces applied to the wheels will not be unballanced as a whole. As a result, the emergent braking operation can be carried out through the remaining braking hydraulic system which continues to operate normally.

It should be noted that the above-mentioned preferred embodiment of this invention may be changed or modified without departing from the scope given in the appended claim.

What is claimed is:

1. In an antilock braking device wherein braking wheel cylinders for a four-wheeled vehicle are connected with each other in the form of X to provide first and second braking hydraulic systems independent of each other, a dual type antilock braking device for four-wheeled vehicles comprising; cylinders (7) and (26) each closed at both ends thereof and divided into a central cylinder chamber and a pair of end cylinder chambers adjacent through first and second partition walls (9, 9') or (28, 28') which are located on both sides of said central cylinder chamber and spaced from each other in the axial direction; and pairs of rods (10, 10') and (29, 29') each pair capable of slidably penetrating through said partition walls (9, 9') or (28, 28'), having first pistons (11, 11') or (30, 30') disposed in said central cylinder chamber and having second pistons (12, 12') or (31, 31') disposed in said corresponding end chambers, wherein primary braking hydraulic chambers (6) and (25) formed between said first partition wall (9), (28) and said corresponding first pistons (11), (30) are communicated with a hydraulic source in said first braking hydraulic system, secondary braking hydraulic chambers (14) and (33) formed between said first partition walls (9), (28) and said corresponding second pistons (12), (31) are respectively communicated with wheel cylinders (19) and (38) for front and rear wheels in said first braking hydraulic system, primary braking hydraulic chambers (6') and (25') formed between said second partition walls (9'), (28') and said corresponding first pistons (11'), (30') are communicated with a hydraulic source in said second braking hydraulic system, secondary braking hydraulic chambers (14') and (33') formed between said second partition walls (9'), (28') and said corresponding second pistons (12'), (31') are respectively communicated with wheel cylinders (19') and (38') for front and rear wheels in said second braking hydraulic system, antilock controlling hydraulic chambers (13) and (32) respectively formed between said paired first pistons (11) and (11') and between said paired second pistons (30) and (30') are communicated with an antilock controlling hydraulic system adapted to regulate output oil pressure from said secondary braking hydraulic chambers (14, 14', 33, 33'), and said rods (10, 10', 29, 29') are respectively formed with communicating grooves (10a, 10a', 29a, 29a') through which said adjacent primary and secondary braking hydraulic chambers (17, 14; 17',14'; 36, 33; 36', 33') are communicated with each other when said rods are moved toward said antilock controlling hydraulic chambers (13) or (32) by a distance exceeding a given amount.

* * * * *